United States Patent [19]

Dumas

[11] 4,243,481

[45] Jan. 6, 1981

[54] SIZING COMPOSITIONS

[75] Inventor: David H. Dumas, Wilmington, Del.

[73] Assignee: Hercules Incorporated, Wilmington, Del.

[21] Appl. No.: 932,103

[22] Filed: Aug. 9, 1978

[30] Foreign Application Priority Date

Aug. 19, 1977 [GB] United Kingdom ............... 34909
Aug. 23, 1977 [GB] United Kingdom ............... 35285

[51] Int. Cl.$^3$ ..................... D21H 3/02; D21H 3/48
[52] U.S. Cl. .............................. 162/158; 162/164 EP
[58] Field of Search .................. 162/158, 164 EP; 260/29.2 N, 29.2 EP; 427/391, 395; 428/476, 537

[56] References Cited

U.S. PATENT DOCUMENTS

| | | | |
|---|---|---|---|
| 2,961,366 | 11/1960 | Weisgerber | 162/158 |
| 3,084,092 | 4/1963 | Arlt | 162/158 |
| 3,248,353 | 4/1966 | Coscia | 162/164 EP |
| 3,483,077 | 12/1969 | Aldrich | 162/158 |
| 3,666,512 | 5/1972 | Kulick et al. | 162/164 EP |
| 3,840,486 | 10/1974 | Dumas | 260/29.4 R |

FOREIGN PATENT DOCUMENTS

| | | | |
|---|---|---|---|
| 602107 | 7/1960 | Canada | 162/158 |
| 1373788 | 11/1974 | United Kingdom | 162/158 |
| 1504853 | 3/1978 | United Kingdom | 162/158 |

*Primary Examiner*—Peter Chin

[57] ABSTRACT

Disclosed is a sizing composition in the form of an aqueous emulsion comprising a hydrophobic cellulose-reactive sizing agent, such as a ketene dimer, and a cationic polymer selected from the group consisting of (1) a cationic polymer obtained by reacting an epihalohydrin with a condensate derived by condensing dicyandiamide or cyanamide with bis-aminopropylpiperazine and (2) a cationic polymer obtained by condensing an epihalohydrin with bis-aminopropylpiperazine. The cationic polymer is a sizing accelerator for the sizing agent.

9 Claims, No Drawings

SIZING COMPOSITIONS

This invention relates to the use of certain cationic polymers in the production of sized paper and sized paperboard.

In particular, this invention relates to the manufacture of sized paper and sized paperboard wherein the sizing agent employed is a hydrophobic cellulose reactive sizing agent such as a ketene dimer sizing agent and there is employed in combination therewith, as sizing accelerators, certain cationic polymers to provide substantially higher off-the-machine sizing than when the cellulose reactive sizing agent is used alone.

U.S. Pat. No. 3,840,486 discloses water-soluble, thermosettable resinous compositions derived by reaction of dicyandiamide, an ammonium salt, formaldehyde, and an acid salt of a water-soluble aminopolyamide such as the water-soluble aminopolyamide derived by reaction of adipic acid and diethylenetriamine. The resinous compositions of U.S. Pat. No. 3,840,486 accelerate the sizing imparted to paper by cellulose reactive sizing agents such as ketene dimers, acid anhydrides, and organic isocyanates. By employing the resinous compositions of U.S. Pat. No. 3,840,486 in combination with the above sizing agents for paper, higher off-the-machine sizing is provided than when using equivalent amounts of the sizing agent alone.

United Kingdom Patent Specification No. 1,373,788 discloses the use of dicyandiamide-formaldehyde condensates as sizing accelerators for ketene dimer sizing agents.

U.S. Pat. No. 3,409,500 discloses a process for the manufacture of sized paper which comprises separately adding an aqueous anionic dispersion of hydrophobic organic cellulose-reactive paper sizing carboxylic anhydride particles to an aqueous suspension of cellulose papermaking fibers and a water-soluble cellulose-substantive cationic polyamine having a molecular weight in excess of 1,000, the amount of said polyamine being at least sufficient to deposit said anhydride particles on said fibers and to accelerate the rate at which said anhydride develops its sizing properties on cellulose fibers at 190° F.–250° F., sheeting said suspension to form a water-laid web, and drying said web at a temperature between 190° F. and 250° F.

In U.S. Pat. No. 3,409,500, at column 3, lines 61–70, it is stated that among the most efficient cationic polymers are the adipic acid-polyalkylenepolyamide-epichlorohydrin polymers, prepared by condensing adipic acid with a polyalkylene-polyamine thereby forming a polyamidepolyamine, and reacting this polymer with epichlorohydrin. Methods for the preparation of agents of this type are disclosed in U.S. Pat. Nos. 2,926,116, 2,926,154 and 3,329,657.

The cationic polymers of U.S. Pat. Nos. 2,926,116 and 2,926,154 are disclosed in U.S. Pat. No. 3,483,077 as being useful retention aids for ketene dimer sizing agents whereby sizing is improved as compared to cationic starch retention aid.

U.S. Pat. No. 3,575,796 discloses a method for the sizing of paper and paperboard products which comprises intimately dispersing within the aqueous pulp slurry, or applying to a prepared paper web, an aqueous emulsion of an N-substituted aziridine compound which is prepared by means of the reaction between a carbonyl-substituted, alpha, beta-ethylenically unsaturated compound such as distearyl maleate and an alkyleneimine such as ethyleneimine. The sizing agent can be uniformly dispersed with a cationic emulsifier, such as a cationic starch, for better retention on the fibers. Column 4, lines 1–44 of U.S. Pat. No. 3,575,796 discloses other cationic agents for use in aiding in the retention of the sizing agents of the invention among which are cationic thermosetting resins such as the reaction products of dibasic acids, polyalkylenepolyamines and epihalohydrins. It is stated also at column 4, lines 45–62, that the cationic agents are also useful as emulsifiers for the sizing agent.

U.S. Pat. No. 3,666,512 discloses compositions comprising hydrophobic cellulose-reactive paper-sizing carboxylic acid anhydrides and a catalyst which accelerates the rate at which the anhydride develops its sizing properties when deposited on cellulose from aqueous medium and heated. The catalyst or promoter for the anhydride size is a water-soluble cationic salt of a cellulose-substantive water-soluble polyamine. Suitable cationic agents are set forth in the table in column 7 of the patent. Among the cationic agents is an amonopolyamide—epichlorohydrin resin, the aminopolyamide being derived from diethylenetriamine and adipic acid.

Canadian Pat. No. 874,777 discloses a method for improving the wet strength, dry strength, and resistance to penetration by liquids of unsized paper comprising imbibing the paper with an amine oxide capable of swelling the paper fibers and a ketene dimer paper sizing agent, heating the paper to swell the paper fibers and removing the amine oxide from the paper.

U.S. Pat. No. 3,046,186 relates to the manufacture of sized paper by the beater-addition process wherein an aqueous cationic dispersion of a hydrophobic ketene dimer is added to an aqueous suspension of cellulosic fibers. The sized paper is manufactured by forming an aqueous suspension of cellulose papermaking fibers and adding thereto an emulsion of a hydrophobic ketene dimer in an aqueous medium containing a cationic dispersing agent which may be a monomeric or high molecular weight hydrophilic or water-soluble basic nitrogenous surface-active agent. The dispersing agents are set forth in columns 3 and 4 of U.S. Pat. No. 3,046,186.

U.S. Pat. No. 3,006,806 discloses the conjoint use of an organic cationic polymer with a ketene dimer in the sizing of paper. Cationic polymers disclosed are melamine-formaldehyde resins (as described in U.S. Pat. No. 2,345,543 to Wohnsiedler and Thomas and U.S. Pat. No. 2,559,220 to Maxwell and Lanes); urea-formaldehyde resins (as described in U.S. Pat. No. 2,657,132 to Daniel, Landes and Suen); cationic corn starch; guanidine-formaldehyde resins (U.S. Pat. No. 2,745,744 to Weidner and Dunlap); alkylenepolyamine-halohydrin resins (as described in U.S. Pat. No. 2,601,597 to Daniel, Wilson and Landes); and cationic urea-formaldehyde resins (as described in British Pat. Nos. 675,477 and 677,184).

U.S. Pat. No. 3,084,092 relates to paper manufactured by the conjoint use of an amino resin and a hydrophobic organic isocyanate. Amino resins disclosed in U.S. Pat. No. 3,084,092 are polyfunctional halohydrin resins of Daniel et al, U.S. Pat. No. 2,595,935; the dicyandiamide-formaldehyde-amine polymers of Dudley et al, U.S. Pat. No. 2,596,014; the urea-monosubstituted urea resins of Schiller et al, U.S. Pat. No. 2,698,787; the polyamine-polyamide linear polymers of House et al, U.S. Pat. No. 2,729,560; the polymers formed by copolymerizing acrylamide and acrylic acid in 9:1 molar ratio; the sulfonated dimethylolurea resins of U.S. Pat. No. 2,582,840; and the aminosulfuric acid-melamine-formaldehyde resins of U.S. Pat. No. 2,688,607.

U.S. Pat. No. 3,248,353 relates to water-soluble cationic-substantive chemo-stable polymers of crosslinked long chain configuration useful as retention aids in the manufacture of paper. The polymers are prepared by substantially completely reacting to a point short of gelation epichlorohydrin with a major proportion of a water-soluble bifunctional amine as chain-forming component and a minor proportion of a water-soluble polyfunctional amine having a functionality greater than 2 as component forming secondary amine linkages in said chain, the ratio of the functionality of the epichlorohydrin to the total functionality of said amines being substantially 1:1. Bifunctional amines include methylamine, ethylamine, ethanolamine, propylamine, N,N'-dimethylethylenediamine, piperazine, and aniline (see column 2, lines 8–16). Polyfunctional amines are disclosed at column 2, lines 17–25 and lines 32–38 and include amines such as ammonia, ethylenediamine, N-methylethylenediamine, diethylenetriamine, tetraethylenepentamine, p-phenylenediamine, p,p'-bisaniline, and 1,3-diamino-2-propanol. The polymers are useful as retention aids for higher fatty acid isocyanates, the higher fatty acid ketene dimers and the higher fatty acid anhydrides (see column 3, lines 18–51).

According to the present invention there are provided certain cationic polymers that are adapted particularly as sizing accelerators for use with hydrophobic cellulose reactive sizing agents, such as ketene dimers, acid anhydrides, and organic isocyanates. The cationic polymers used in this invention increase the rate of sizing of the hydrophobic cellulose reactive sizing agents.

According to a further aspect of the invention there are provided novel sizing compositions for cellulose fibers comprising at least one hydrophobic cellulose reactive sizing agent and at least one cationic polymer (sizing accelerator) as disclosed.

The preferred sizing compositions will be aqueous emulsions comprised of the cellulose reactive sizing agent, at least one emulsifier, and, as a sizing accelerator, at least one of the cationic polymers. The term "emulsion" is used herein, as is customary in the art, to mean either a dispersion of the liquid-in-liquid type or of the solid-in-liquid type.

Aqueous emulsions of hydrophobic cellulose reactive sizing agents are known in the art and are commercially available. To prepare the novel sizing compositions of this invention there is thoroughly admixed with the emulsion an amount of cationic polymer sufficient to increase the sizing action of the sizing agent. It has been determined that from 0.25 part to 3 parts by weight of the cationic polymer for each part by weight of the hydrophobic cellulose reactive sizing agent present in the emulsion provides good results.

Thus, the novel sizing compositions of this invention are aqueous emulsions that consist essentially of a hydrophobic cellulose reactive sizing agent, such as a ketene dimer, at least one emulsifier, and, as sizing accelerator, at least one of the cationic polymers. The amount of emulsifier(s) employed will be that sufficient to obtain and maintain an emulsion that is stable for a prolonged period of time and is within the skill of the art.

Emulsifier employed can be chosen from emulsifiers conventionally employed in the production of emulsions of cellulose reactive sizing agents. Such emulsifiers are well known in the art and include cationic starches that are water-soluble starches carrying sufficient cationic amino groups, quaternary ammonium, or other cationic groups to render the starch, as a whole, cellulose-substantive. An example of such a cationic starch is the cationic amine modified starch described in United Kingdom Patent Specification No. 903,416.

Another emulsifier that can be used is a water-soluble cationic thermosetting resin obtained by reacting epichlorohydrin with a water-soluble aminopolyamide formed from a dicarboxylic acid and a polyalkylene polyamine. Resins of this type are described in United Kingdom Patent Specification No. 865,727.

Cationic polymers useful as size accelerators are set forth below.

Cationic polymer (1) is a nitrogen-containing polymer obtained by first condensing bis-aminopropylpiperazine with dicyandiamide or cyanamide. The condensation reaction forms a low molecular weight polymer which is then reacted with an epihalohydrin, such as epichlorohydrin.

Cationic polymer (1) is prepared in two stages. First, a prepolymer condensate is prepared by the condensation of bis-aminopropylpiperazine (BAPP) and dicyandiamide in a mole ratio of BAPP to dicyandiamide of from about 0.5:1 to 1:0.5. The preferred mole ratio is 1:1. The reactants are admixed and heated at a temperature of from about 150°–220° C. for from ½ hour to 4 hours, time varying inversely with temperature. Ammonia, $NH_3$, is evolved during reaction and reaction is essentially complete when $NH_3$ ceases to be evolved. The prepolymer, in aqueous media, is then reacted with an epihalohydrin. Reaction with epihalohydrin is carried out at elevated temperature, preferably at a temperature of 50° C. to 80° C., until the reaction product has a viscosity, as measured on the Gardner-Holdt scale, of F to S. The amount of epihalohydrin used can be from 0.3 mole to 2 moles, preferably 1 mole to 1.5 moles, for each mole of amine nitrogen present in the prepolymer condensate. If cyanamide is used instead of dicyandiamide, moles of cyanamide used will be twice the mole(s) of dicyandiamide.

In the examples that follow, all parts and percentages are by weight unless otherwise specified.

The following example is illustrative of the preparation of cationic polymer (1).

EXAMPLE 1

To a 1-liter, 3-necked round-bottom flask equipped with a mechanical stirrer, heating mantle, thermowatch temperature controller, and a reflux condenser attached to a water trap were charged 200 g. (1 mole) of bis-aminopropylpiperazine and 84 g. (1 mole) dicyandiamide. Heating was started and continued to 160° C. with the evolution of ammonia. The mixture was held at 160° C. for 3 hours during which time more than 1 mole of ammonia was collected and then the reaction was quenched by the addition of 284 g. of distilled water giving an aqueous dispersion of 44.4% total solids. To a 500 ml., 3-necked round-bottom flask containing a large fourth hole suitable for the insertion of pH electrodes to monitor the reaction was attached a mechanical stirrer, reflux condenser and a Spurlin-Spence viscometer (essentially a fine bore tube with 5 ml. reservoir which is filled by suction and the time needed to pass through a fixed distance is measured). This reaction vessel was charged with 113 g. (50 g. prepolymer solids) of the aqueous solution of the condensation prepolymer above prepared (equal to 0.4 amine equivalents) and 87 g. of distilled water in order to dilute the material to 25% solids. Then 46 g. (0.5 mole) of epichlorohydrin was added. The initial reaction pH was 12.1 There was an exothermic reaction which carried the temperature to 60° C. and then heat was applied to maintain the temperature at 70° C. The viscosity began to increase 45 minutes after the epichlorohydrin addition when the pH was 7.0. The reaction mass was heated another 45 minutes during which time the viscosity increased to 15 seconds on the Spurlin-Spence viscometer (equivalent to a Gardner-Holdt viscosity of N) and the reaction was quenched by the addition of 234 g. of distilled water and 14.4 g. of formic acid which lowered the pH of the product of 4.0. The total solids was 24.0%.

Cationic polymer (2) is a nitrogen-containing polymer obtained by condensing an alkylenediamine with an epihalohydrin, such as epichlorohydrin, in a mole ratio alkylenediamine to epihalohydrin of 2:1. The product of this reaction is reacted with dicyandiamide or cyanamide to produce a low molecular weight polymer which is then reacted with an epihalohydrin, such as epichlorohydrin. Examples of alkylenediamines that can be used in the preparation of this cationic polymer (2) are ethylenediamine, propylenediamine, and hexamethylenediamine. Mixtures of two or more alkylenediamines can be used if desired.

Cationic polymer (2) is produced in three stages. First, the alkylenediamine is reacted with an epihalohydrin in a mole ratio of 2 to 1 at a temperature of 50°–80° C., over a period of 1 hour to 3 hours (time varies inversely with temperature) to provide a reaction product. This reaction product is then reacted with dicyandiamide at a temperature of 150°–220° C. for from ½ hour to 4 hours, time varying inversely with temperature. The amount of dicyandiamide employed will be from 1 mole to 2 moles for each mole of epichlorohydrin used in reaction with the alkylenepolyamine, with 1 mole being preferred. This reaction product is then reacted with epihalohydrin in an amount of 2 to 2.5 moles for each mole of epihalohydrin used in reaction with the alkylenediamine at a temperature of 25°–70° C. for a period of time of 1 hour to 4 hours (time varies inversely with temperature). If cyanamide is used in place of dicyandiamide, moles of cyanamide used will be twice the mole(s) of dicyandiamide.

The following example is illustrative of the preparation of cationic polymer (2).

EXAMPLE 2

To a 500 ml. round-bottom, 3-necked flask equipped with a heating mantle, thermowatch, mechanical stirrer and reflux condenser connected to a water trap was added 120 g. ethylenediamine (2 moles). This was heated to 50° C. and 92 g. of epichlorohydrin (1 mole) was added dropwise over a 2 hour period. The temperature was allowed to rise to 60° C., then increased to 80° C. by the application of heat. Dicyandiamide (84 grams-1 mole) was then added to the contents of the flask. The reaction mixture was heated to 160° C. and maintained at this temperature for two hours. About 1.8 moles of $NH_3$ was evolved during the condensation reaction. 300 ml. of water was added to provide a reaction mass containing 48% solids. 104 g. of the 48% solids reaction mass (50 g. solids) was diluted with water to 25% solids and 43 g. epichlorohydrin was added over a period of 15 minutes. This reaction mass was heated to 70° C. and maintained at this temperature for 5 hours. The final product consisted of 32% by weight solids.

Cationic polymer (3) is a nitrogen-containing polymer obtained by condensing 1,3-dicyanobenzene with a polyalkylenepolyamine to form a low molecular weight polymer. The resulting polymer is then reacted with an epihalohydrin, such as epichlorohydrin. The polyalkylenepolyamine used in preparing cationic polymer (3) can be a polyethylenepolyamine, a polypropylenepolyamine, a polybutylenepolyamine and the like. Specific examples of such polyalkylenepolyamines are diethylenetriamine, triethylenetetramine, tetraethylenepentamine, and dipropylenetriamine.

Cationic polymer (3) is prepared in two stages. First, 1,3-dicyanobenzene is condensed with a polyalkylene polyamine in a mole ratio of 1:1 to provide a condensation prepolymer. This condensation reaction is carried out at a temperature of from 150°–200° C. for a period of 1 hour to 4 hours. Time varies inversely with temperature. The condensation prepolymer is then reacted, in aqueous media, with an epihalohydrin at elevated temperature, preferably 50° C.–90° C. for about 1 hour to 4 hours. Time varies inversely with temperature. One mole of epihalohydrin is used for each mole of amine nitrogen present in the condensation prepolymer.

EXAMPLE 3

Equipment as used in Example 2 was used in this example. 64 g. (0.5 mole) 1,3-dicyanobenzene and 51.5 g (0.5 mole) diethylenetriamine were added to the flask to provide a mixture which was heated to a temperature of 165° C. and maintained at this temperature for four hours. During this time about 0.5 mole of $NH_3$ was evolved. The reaction product was cooled to room temperature (about 23° C.). 23 g. of the reaction product (0.11 amine equivalents) was dissolved in 25 g. methanol, then 75 g. of water was added, followed by 15 g. (0.16 mole) epichlorohydrin, and the reaction mixture was heated to 90° C. and maintained at this temperature for about 2 hours. The product consisted of 29% by weight solids.

Cationic polymer (4) is a nitrogen-contining polymer obtained by the condensation of bis-aminopropylpiperazine with an epihalohydrin, such as epichlorohydrin.

Cationic polymer (4) is prepared by the condensation reaction of bis-aminopropylpiperazine and an epihalohydrin in a mole ratio of bis-aminopropylpiperazine to epihalohydrin of 1:3 to 1:8, preferably in a 1:4 mole ratio. Reaction is carried out at a temperature of 50°–90° C. until the reaction product has a viscosity, as measured on the Gardner-Holdt scale, of F to S. This will usually require a period of 1 hour to 4 hours, depending on the temperature employed.

EXAMPLE 4

Apparatus as used in Example 2 was used in this example. 64 g. (0.32 mole) of bis-aminopropylpiperazine was mixed with 354 g. water in the flask and 125 g. (1.34 moles) epichlorohydrin was added thereto, slowly, over 15 minutes.

As the epichlorohydrin was added, the temperature of the reaction mass rose rapidly to 70° C. and a cooling water bath was applied to maintain the temperature at 70° C. After the epichlorohydrin addition was complete, the cooling bath was removed and the temperature was maintained at 70° C. with a heating mantle.

The viscosity rose gradually over an hour and a half to a Gardner-Holdt viscosity of N. The reaction was quenched by addition of 398 g. of water, 6 g. formic acid and external cooling. The resulting solution had a solids content of 20% and a pH of 5.

Acid anhydrides useful as cellulose reactive sizing agents for paper are well known in the art and include (A) rosin anhydride, see U.S. Pat. No. 3,582,464; (B) anhydrides having the structure

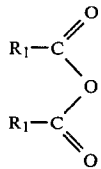 (I)

wherein $R_1$ is a saturated or unsaturated hydrocarbon radical, the hydrocarbon radical being a straight or branched chain alkyl radical, an aromatic substituted alkyl radical, or an alkyl substituted aromatic radical so long as the hydrocarbon radical contains a total of from 11 to 39 carbon atoms; and (C) cyclic dicarboxylic acid anhydrides having the structure

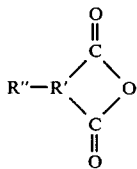 (II)

where R' represents a dimethylene or trimethylene radical and where R" is a hydrocarbon radical containing from 8 through 22 carbon atoms which are selected from the group consisting of alkyl, alkenyl, aralkyl or aralkenyl. Substituted cyclic dicarboxylic acid anhydrides falling within the above formula (II) are substituted succinic and glutaric anhydrides. In formula (I) above each $R_1$ can be the same hydrocarbon radical or each $R_1$ can be a different hydrocarbon radical.

Specific examples of anhydrides of formula (I) are myristoyl anhydride; palmitoyl anhydride; oleoyl anhydride; and stearoyl anhydride.

Specific examples of anhydrides of formula (II) are isooctadecenyl succinic acid anhydride; n-hexadecenyl succinic acid anhydride; octenyl succinic acid anhydride; and octyl glutaric acid anhydride.

Hydrophobic organic isocyanates used as sizing agents for paper are well known in the art. Best results are obtained when the hydrocarbon chains of the isocyanates contain at least 12 carbon atoms, preferably from 14 to 36 carbon atoms. Such isocyanates include rosin isocyanate; dodecyl isocyanate; octadecyl isocyanate; tetradecyl isocyanate; 6-ethyldecyl isocyanate; 6-phenyldecyl isocyanate; and polyisocyanates such as 1,18-octadecyl diisocyanate and 1,12-dodecyl diisocyanate, wherein one long chain alkyl group serves two isocyanate radicals and imparts hydrophobic properties to the molecule as a whole.

Ketene dimers used as cellulose reactive sizing agents are dimers having the formula:

(R'''CH=C=O)$_2$ where R''' is a hydrocarbon radical, such as alkyl having at least 8 carbon atoms, cycloalkyl having at least 6 carbon atoms, aryl, aralkyl and alkaryl. In naming ketene dimers, the radical R''' is named followed by "ketene dimer". Thus, phenyl ketene dimer is:

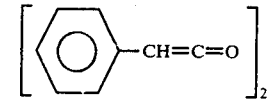

benzyl ketene dimer:

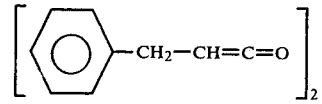

and decyl ketene dimer is $(C_{10}H_{21}-CH=C=O)_2$. Examples of ketene dimers include octyl, decyl, dodecyl, tetradecyl, hexadecyl, octadecyl, eicosyl, docosyl, tetracosyl, phenyl, benzyl, beta-naphthyl and cyclohexyl ketene dimers, as well as the ketene dimers prepared from montanic acid, naphthenic acid, $\Delta^{9,10}$-decylenic acid, $\Delta^{9,10}$-dodecylenic acid, palmitoleic acid, oleic acid, ricinoleic acid, linoleic acid, linolenic acid, and eleostearic acid, as well as ketene dimers prepared from naturally occurring mixtures of fatty acids, such as those mixtures found in coconut oil, babassu oil, palm kernel oil, palm oil, olive oil, peanut oil, rape oil, beef tallow, lard (leaf) and whale blubber. Mixtures of any of the above-named fatty acids with each other may also be used.

EXAMPLE 5

An emulsion of a ketene dimer prepared from a mixture of palmitic and stearic acids is prepared by admixing 880 parts of water, 60 parts of cationic corn starch and 10 parts of sodium lignin sulfonate. The mixture is adjusted to pH of about 3.5 with 98% sulfuric acid. The resulting mixture is heated at 90°–95° C. for about one hour. Water is then added to the mixture in an amount sufficient to provide a mixture of 1750 parts (total weight). About 240 parts of the ketene dimer is stirred into the mixture together with 2.4 parts of thiadiazine. The thiadiazine is used as a preservative. The resulting premix (at 65° C.) is homogenized in one pass through an homogenizer at 4000 p.s.i. The homogenized product is diluted with water to a ketene dimer solids content of about 6%.

As is well known in the art, hydrophobic cellulose reactive sizing agents are used in the internal sizing of paper and in the external sizing of paper. The accelerators of this invention can be used in combination with the sizing agent in either method.

EXAMPLE 6

The products of Example 1 and Example 5 were combined with addition of water, as required, to provide an aqueous sizing composition comprised of 0.10% ketene dimer and 0.10% of the nitrogen-containing polymer of Example 1.

EXAMPLE 7

The products of Example 2 and Example 5 were combined with addition of water, as required, to provide an aqueous sizing composition comprised of 0.10% ketene dimer and 0.10% of the nitrogen-containing polymer of Example 2.

EXAMPLE 8

The products of Example 3 and Example 5 were combined with addition of water, as required, to provide an aqueous sizing composition comprised of 0.10% ketene dimer and 0.10% of the nitrogen-containing polymer of Example 3.

EXAMPLE 9

The products of Example 4 and Example 5 were combined with addition of water, as required, to provide an aqueous sizing composition comprised of 0.10% ketene dimer and 0.10% of the nitrogen-containing polymer of Example 4.

EXAMPLE 10

An aqueous sizing composition was prepared to provide a sizing composition as in Examples 6, 7, 8 and 9 with the exception that as the nitrogen-containing polymer there was employed an aminopolyamide-epichlorohydrin resin. The aminopolyamide was derived from adipic acid and diethylenetriamine. The test results show this cationic polymer does not function as an accelerator for ketene dimer.

The above sizing compositions are applied to the surface of a sheet of 40 lb./3000 ft.$^2$ waterleaf paper. The sheet is made from a 50:50 hardwood;softwood pulp blend on a pilot paper machine. Each sizing composition is adjusted to pH 7 before application to the sheet in the nip of a horizontal size press. The size press runs at 40 ft./min. and the wet pickup is 70%. Retention of the ketene dimer size is the same in all of these runs. The sized sheets are dried at 93° C. for 20 sec. on a laboratory drum drier to 5% moisture. The sizing is measured by the Hercules Size Test with test solution No. 2 to the indicated reflectance. The off-machine data are obtained within two minutes of drying and the natural aged data after 2–5 days storage at room temperature. It is known in the art that ketene dimer size develops substantially all its sizing properties in the paper in 3 days. After this time the size properties of the paper remain essentially the same. The off-machine result is the critical result as it reflects the rate at which sizing develops. The surface application of the sizing compositions eliminates any retention effects of the cationic polymer used.

Table I

| Sizing Composition of Example | Hercules Size Test | |
|---|---|---|
| | Off-The Machine to 80% Reflectance | Natural Aged to 85% Reflectance |
| 6 | 127 | 540 |
| 7 | 26 | 517 |
| 8 | 15 | 450 |
| 9 | 165 | 536 |
| 10 | 0 | 525 |
| Control (ketene dimer alone) | 0 | 450 |

The above description is illustrative of this invention and not in limitation thereof.

What I claim and desire to protect by Letters Patent is:

1. In the method of internally or externally sizing paper with a hydrophobic cellulose-reactive sizing agent selected from the group consisting of ketene dimers, acid anhydrides, and organic isocyanates wherein there is employed in combination therewith a sizing accelerator, the improvement wherein there is employed as the sizing accelerator a cationic polymer selected from the group consisting of (1) a cationic polymer obtained by reacting an epihalohydrin with (i) a condensate derived by the condensation of bis-aminopropylpiperazine and dicyandiamide in a mole ratio of bis-aminopropylpiperazine to dicyandiamide of from about 0.5:1 to 1:0.5 or (ii) a condensate derived by the condensation of bis-aminopropylpiperazine and cyanamide in a mole ratio of bis-aminopropylpiperazine to cyanamide of from about 0.5:2 to 1:1, the amount of epihalohydrin employed being from 0.3 mole to 2 moles for each mole of amine nitrogen present in the condensate and (2) a cationic polymer obtained by the condensation of bis-aminopropylpiperazine and an epihalohydrin in a mole ratio of bis-aminopropylpiperazine to epihalohydrin of 1:3 to 1:8, the amount of sizing accelerator employed being an amount sufficient to increase the off-the-machine sizing properties of the sizing agent.

2. The method of claim 1 wherein the epihalohydrin used to prepare the cationic polymers (1) and (2) is epichlorohydrin.

3. In the method of internally or externally sizing paper with a hydrophobic cellulose-reactive sizing agent selected from the group consisting of ketene dimers, acid anhydrides, and organic isocyanates wherein there is employed in combination therewith a sizing accelerator, the improvement wherein there is employed as the sizing accelerator a cationic polymer selected from the group consisting of (1) a cationic polymer obtained by reacting epichlorohydrin with (i) a condensate derived by the condensation of bis-aminopropylpiperazine and dicyandiamide in a mole ratio of 1:1 or (ii) a condensate derived by the condensation of bis-aminopropylpiperazine and cyanamide in a mole ratio of bis-aminopropylpiperazine to cyanamide of 1:2, the amount of epichlorohydrin employed being from 1 mole to 1.5 moles for each mole of amine nitrogen present in the condensate and (2) a cationic polymer obtained by the condensation of bis-aminopropylpiperazine and epichlorohydrin in a mole ratio of bis-aminopropylpiperazine to epichlorohydrin of 1:4, the amount of sizing accelerator employed being an amount sufficient to increase the off-the-machine sizing properties of the sizing agent.

4. The method of claim 3 wherein the sizing agent is a ketene dimer and the sizing accelerator is cationic polymer (1).

5. The method of claim 3 wherein the sizing agent is a ketene dimer and the sizing accelerator is cationic polymer (2).

6. The method of claim 3 wherein the sizing agent is an acid anhydride and the sizing accelerator is cationic polymer (1).

7. The method of claim 3 wherein the sizing agent is an acid anhydride and the sizing accelerator is cationic polymer (2).

8. The method of claim 3 wherein the sizing agent is an organic isocyanate and the sizing accelerator is cationic polymer (1).

9. The method of claim 3 wherein the sizing agent is an organic isocyanate and the sizing accelerator is cationic polymer (2).

* * * * *